United States Patent
Schwalm et al.

(10) Patent No.: US 9,212,252 B2
(45) Date of Patent: Dec. 15, 2015

(54) RADIATION-CURABLE, WATER-DISPERSIBLE POLYURETHANES AND POLYURETHANE DISPERSIONS

(75) Inventors: Reinhold Schwalm, Wachenheim (DE); Susanne Neumann, Speyer (DE); Frank Voellinger, Knoeringen (DE); Peter Thuery, Ludwigshafen (DE); Uwe Burkhardt, Ludwigshafen (DE); Katharina Andes, Maxdorf (DE); Tanja Becker, Altrip (DE); Manfred Biehler, Ilbesheim (DE)

(73) Assignee: BASF SE, Ludwigshafen (DE)

( * ) Notice: Subject to any disclaimer, the term of this patent is extended or adjusted under 35 U.S.C. 154(b) by 71 days.

(21) Appl. No.: 13/389,103

(22) PCT Filed: Aug. 2, 2010

(86) PCT No.: PCT/EP2010/061170
§ 371 (c)(1),
(2), (4) Date: Feb. 6, 2012

(87) PCT Pub. No.: WO2011/015540
PCT Pub. Date: Feb. 10, 2011

(65) Prior Publication Data
US 2012/0136111 A1 May 31, 2012

(30) Foreign Application Priority Data

Aug. 6, 2009 (EP) ..................... 09167330

(51) Int. Cl.
| | | |
|---|---|---|
| *C08G 18/00* | (2006.01) | |
| *C08G 18/79* | (2006.01) | |
| *C08G 18/08* | (2006.01) | |
| *C09D 175/14* | (2006.01) | |
| *C08G 18/67* | (2006.01) | |
| *C08G 18/78* | (2006.01) | |
| *C09D 175/16* | (2006.01) | |

(52) U.S. Cl.
CPC .......... *C08G 18/792* (2013.01); *C08G 18/0823* (2013.01); *C08G 18/0861* (2013.01); *C08G 18/0866* (2013.01); *C08G 18/672* (2013.01); *C08G 18/673* (2013.01); *C08G 18/7831* (2013.01); *C09D 175/14* (2013.01); *C09D 175/16* (2013.01)

(58) Field of Classification Search
CPC ............. C09D 175/14; C08G 18/0861; C08G 18/0866; C08G 18/673
USPC .............. 522/90, 92, 93, 96, 97, 98; 525/452, 525/455; 524/589, 590, 591, 839, 840, 871, 524/872, 873, 875
See application file for complete search history.

(56) References Cited

U.S. PATENT DOCUMENTS

| | | | |
|---|---|---|---|
| 4,596,678 A | 6/1986 | Merger et al. | |
| 4,596,679 A | 6/1986 | Hellbach et al. | |
| 5,087,739 A | 2/1992 | Bohmholdt et al. | |
| 5,596,065 A * | 1/1997 | Gerlitz et al. | 528/71 |
| 6,444,721 B2 | 9/2002 | Schwalm et al. | |
| 7,122,595 B1 * | 10/2006 | Ott et al. | 524/502 |
| 7,888,402 B2 | 2/2011 | Wagner et al. | |
| 7,943,682 B2 | 5/2011 | Wagner et al. | |
| 2003/0220446 A1 | 11/2003 | Faler et al. | |
| 2006/0009589 A1 | 1/2006 | Haering et al. | |
| 2006/0014099 A1 | 1/2006 | Faler et al. | |
| 2008/0280139 A1 | 11/2008 | Wagner et al. | |
| 2010/0029800 A1 | 2/2010 | Gruber et al. | |
| 2012/0040120 A1 | 2/2012 | Schwalm et al. | |

FOREIGN PATENT DOCUMENTS

| | | | |
|---|---|---|---|
| DE | 33 16 593 | 11/1984 | |
| DE | 41 13 160 | 10/1992 | |
| DE | 40 10 783 | 11/1994 | |
| DE | 197 24 199 | 12/1998 | |
| DE | 198 26 712 | 12/1999 | |
| DE | 199 13 353 | 9/2000 | |
| DE | 199 57 900 | 6/2001 | |
| DE | 100 13 186 | 9/2001 | |
| DE | 100 13 187 | 10/2001 | |
| DE | 10 2008 002 008 | 12/2008 | |
| DE | 102009046713 | 6/2010 | |
| EP | 0 054 105 | 6/1982 | |
| EP | 0 092 269 | 10/1983 | |
| EP | 0 126 299 | 11/1984 | |
| EP | 0 126 300 | 11/1984 | |
| EP | 0 270 303 | 6/1988 | |
| EP | 0 355 443 | 2/1990 | |
| EP | 0 548 669 | 6/1993 | |
| EP | 0 680 985 | 11/1995 | |
| EP | 0 694 531 | 1/1996 | |
| EP | 0 703 255 | 3/1996 | |
| EP | 1 118 627 | 7/2001 | |
| EP | 1 707 600 | 10/2006 | |
| EP | 2 130 846 | 12/2009 | |
| WO | 98 33761 | 8/1998 | |
| WO | 00 39183 | 7/2000 | |
| WO | 2006 005491 | 1/2006 | |
| WO | 2006 089935 | 8/2006 | |
| WO | 2007 063025 | 6/2007 | |
| WO | 2008 148739 | 12/2008 | |
| WO | WO-2009/147092 | * 10/2009 | C08G 18/67 |

OTHER PUBLICATIONS

U.S. Appl. No. 13/523,363, filed Jun. 14, 2012, Schwalm, et al.

* cited by examiner

*Primary Examiner* — Michael L Leonard
(74) *Attorney, Agent, or Firm* — Oblon, McClelland, Maier & Neustadt, L.L.P.

(57) ABSTRACT

The present invention relates to dispersible polyurethanes and polyurethane dispersions curable with UV radiation, to a process for preparing them, and to their use.

15 Claims, No Drawings

RADIATION-CURABLE, WATER-DISPERSIBLE POLYURETHANES AND POLYURETHANE DISPERSIONS

The present invention relates to dispersible polyurethanes and polyurethane dispersions curable with UV radiation, to a process for preparing them, and to their use.

DE 102008002008 and WO 2008/148739 disclose radiation-curable, water-dispersible polyurethanes which comprise a polyalkylene glycol as a synthesis component.

A disadvantage is that the long-chain polyalkylene glycols on the one hand, as a result of their high molar mass, lower the density of radiation-curable groups in the polyurethanes, and on the other hand, owing to their hydrophilicity, produce a rather tardy drying, with the consequence that the films obtained with these compounds remain tacky for a long time. As a result of their hydrophilicity, moreover, long-chain polyalkylene glycols have an unfavorable effect on the water resistance of the resultant films.

WO 2007/063025 and WO 2006/089935 describe radiation-curable, water-dispersible polyurethanes based on polyisocyanates containing allophanate groups, with a high double-bond density of 1.3 up to 8 mol/kg. The double-bond densities reported in the explicitly disclosed examples are up to 2 or 2.4 mol/kg.

The hardness and elasticity of the coatings obtained with these polyurethanes are high, but are not sufficient across a very wide variety of applications, as on wooden window frames, for example. Moreover, those dispersions in particular which comprise relatively long-chain polyetherol segments have a tendency toward separation in the course of prolonged storage times.

Weathering-stable polyurethanes that are curable by means of high-energy radiation are claimed by EP 1118627 (=U.S. Pat. No. 6,444,721). The coatings are produced by drying films of a polyurethane dispersion prepared from polyisocyanates, cycloaliphatic diols and/or diamines, NCO reactive compounds with at least one unsaturated group and also a dispersive group. The coatings produced in this way are stable to weathering. A disadvantage found has been the relatively low scratch resistance.

It was an object of the present invention to provide radiation-curable, water-dispersible polyurethanes which in the form of their dispersions are stable, which yield tack-free films, and which produce coatings having a high hardness.

This object has been achieved by means of mixtures of radiation-curable, water-dispersible polyurethanes, comprising at least one radiation-curable water-dispersible polyurethane (A), synthesized from (a1) at least one polyisocyanate based on aliphatic and/or cycloaliphatic diisocyanate, (a2) at least one compound having at least one, preferably just one, group that is reactive toward isocyanate groups, and having at least one free-radically polymerizable C=C double bond, (a3) optionally at least one compound having at least two groups that are reactive toward isocyanate groups, that are selected from hydroxyl, mercapto, primary and/or secondary amino groups, having a number-average molar weight Mn of not more than 500 g/mol, (a4) optionally at least one compound having at least two groups that are reactive toward isocyanate groups, that are selected from hydroxyl, mercapto, primary and/or secondary amino groups, having a number-average molar weight Mn of more than 500 g/mol, (a5) at least one compound having at least one isocyanate-reactive group and at least one dispersive group, (a6) optionally at least one compound other than (a2) and (a5) that has just one group that is reactive toward isocyanate groups, and (a7) optionally at least one polyisocyanate other than (a1), the amount of groups in (a4) that are reactive toward isocyanate groups being 0 to not more than 10 mol %, based on the sum of the isocyanate groups in (a1) and (a7), and the polyurethane (A) containing at least 3 mol/kg of free-radically polymerizable C=C double bonds, and at least one radiation-curable water-dispersible polyurethane (B), different from (A) and synthesized from (b1) at least one di- or polyisocyanate based on aliphatic and/or cycloaliphatic diisocyanate, (b2) at least one compound having at least one, preferably just one, group that is reactive toward isocyanate groups, and having at least one free-radically polymerizable C=C double bond, (b3) optionally at least one compound having at least two groups that are reactive toward isocyanate groups, that are selected from hydroxyl, mercapto, primary and/or secondary amino groups, having a number-average molar weight Mn of not more than 500 g/mol, (b4) obligatorily at least one compound having at least two groups that are reactive toward isocyanate groups, that are selected from hydroxyl, mercapto, primary and/or secondary amino groups, having a number-average molar weight Mn of more than 500 g/mol, (b5) at least one compound having at least one isocyanate-reactive group and at least one dispersive group, (b6) optionally at least one compound other than (b2) and (b5) that has just one group that is reactive toward isocyanate groups, and (b7) optionally at least one polyisocyanate other than (b1), at least one of the compounds (b4) being a polyesterdiol in an amount of groups in (b4) that are reactive toward isocyanate groups of more than 10 mol %, based on the sum of the isocyanate groups in (b1) and (b7), with a mass ratio (A):(B) of 5:95 to 95:5.

Preferably the mass ratio (A):(B) is from 10:90 to 90:10, more preferably 20:80 to 80:20, very preferably 30:70 to 70:30 and more particularly 40:60 to 60:40.

In the dispersions of the invention it is preferred not to use any compounds that contain isocyanate groups and in which some or all of the isocyanate groups have been reacted with what are known as blocking agents. Blocking agents in this context are compounds which convert isocyanate groups into blocked (capped or protected) isocyanate groups, which then, below the temperature referred to as the deblocking temperature, do not exhibit the typical reactions of a free isocyanate group. Compounds of this kind which in accordance with the invention are preferably not used, containing blocked isocyanate groups, are typically employed in dual-cure coating materials, which are cured to completion by isocyanate group curing. Following their preparation, the polyurethane dispersions of the invention preferably no longer contain any free isocyanate groups, i.e., they contain in general less than 1% by weight NCO, preferably less than 0.75%, more preferably less than 0.66%, and very preferably less than 0.3% by weight NCO (calculated with a molar weight of 42 g/mol).

Components (a1) and (b1)

Particularly suitable polyisocyanates as components (a1) and (b1) for the polyurethanes of the invention are polyisocyanates based on (cyclo)aliphatic diisocyanates. As component (b1), additionally, (cyclo)aliphatic diisocyanates are suitable.

The term (cyclo)aliphatic is an abbreviation in this specification for cycloaliphatic or aliphatic.

Cycloaliphatic isocyanates are those which comprise at least one cycloaliphatic ring system.

Aliphatic isocyanates are those which comprise exclusively linear or branched chains, i.e., acyclic compounds.

The polyisocyanates which can be used in accordance with the invention contain no aromatic groups.

The monomeric isocyanates are preferably diisocyanates which carry just two isocyanate groups. It would also be possible in principle, however, for them to be monoisocyanates with one isocyanate group; such compounds, however, are less preferred.

Also suitable in principle are higher isocyanates containing on average more than 2 isocyanate groups; these, however, are less preferred. Suitability therefor is possessed, for example, by triisocyanates such as triisocyanatononane or 2'-isocyanatoethyl 2,6-diisocyanatohexanoate, or the mixtures of di-, tri- and higher polyisocyanates.

The monomeric isocyanates contain substantially no reaction products of the isocyanate groups with themselves.

The monomeric isocyanates are preferably isocyanates having 4 to 20 C atoms. Examples of typical aliphatic diisocyanates are tetramethylene diisocyanate, 1,5-pentamethylene diisocyanate, hexamethylene diisocyanate (1,6-diisocyanato-hexane), octamethylene diisocyanate, decamethylene diisocyanate, dodecamethylene diisocyanate, tetradecamethylene diisocyanate, derivatives of lysine diisocyanate, (e.g., methyl- or ethyl 2,6-diisocyanatohexanoate), trimethylhexane diisocyanate or tetramethylhexane diisocyanate. Examples of cycloaliphatic diisocyanates are 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane(isophorone diisocyanate), 1,3- or 1,4-bis(isocyanatomethyl)cyclohexane or 2,4-, or 2,6-diisocyanato-1-methylcyclohexane, and also 3 (or 4), 8 (or 9)-bis(isocyanato-methyl)-tricyclo[5.2.1.0$^{2,6}$]decane isomer mixtures.

Particularly preferred diisocyanates are 1,6-hexamethylene diisocyanate, 1,3-bis(isocyanatomethyl)cyclohexane, and isophorone diisocyanate; very particular preference is given to isophorone diisocyanate and 1,6-hexamethylene diisocyanate, with more particular preference being given to isophorone diisocyanate.

It is also possible for mixtures of the stated isocyanates to be present.

Isophorone diisocyanate usually takes the form of a mixture, more particularly a mixture of the cis and trans isomers, generally in a ratio of around 60:40 to 80:20 (w/w), preferably in a ratio of around 70:30 to 75:25, more preferably in a ratio of around 75:25.

The amount of isomeric compounds in the diisocyanate is not critical to the process of the invention. Thus 1,6-hexamethylene diisocyanate may comprise, for example, a small fraction of 2- and/or 3-methyl-1,5-pentamethylene diisocyanate.

For the present invention it is possible to use polyisocyanates not only based on those diisocyanates obtained by phosgenating the corresponding amines, but also those prepared without the use of phosgene, i.e., by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087,739), for example, (cyclo)aliphatic diisocyanates, such as 1,6-hexamethylene diisocyanate (HDI), can be prepared by reacting the (cyclo)aliphatic diamines with, for example, urea and alcohols to form (cyclo) aliphatic biscarbamic esters, and cleaving them thermally to give the corresponding diisocyanates and alcohols. The synthesis takes place, usually, continuously in a circulation process, and in the presence or absence of N-unsubstituted carbamic esters, dialkyl carbonates, and other byproducts recycled from the reaction process. Diisocyanates obtained in this way generally have a very low, or even unmeasurable, fraction of chlorinated compounds, which can lead to advantageous color numbers in the products. It is a further advantage of the present invention that the process of the invention is based on aliphatic diisocyanates and is independent of their preparation, i.e., independent of whether the preparation is via a phosgenation or via a phosgene-free process.

In one embodiment of the present invention the diisocyanate has a total hydrolyzable chlorine content of less than 200 ppm, preferably of less than 120 ppm, more preferably less than 80 ppm, very preferably less than 50 ppm, more particularly less than 15 ppm, and especially less than 10 ppm. This may be measured, for example, by the ASTM specification D4663-98. It is also, however, possible of course to use diisocyanates having a higher chlorine content, of up to 500 ppm, for example.

It will be appreciated that it is also possible to use mixtures of diisocyanate obtained by reacting the corresponding diamine with, for example, urea and alcohols, and cleaving the resultant biscarbamic esters, with diisocyanate obtained by phosgenating the corresponding amine.

The polyisocyanates based on these diisocyanates are preferably the following compounds:

1) Polyisocyanates containing isocyanurate groups and derived from aliphatic and/or cycloaliphatic diisocyanates. Particularly preferred here are the corresponding aliphatic and/or cycloaliphatic isocyanato-isocyanurates, and more particularly those based on hexamethylene diisocyanate and/or isophorone diisocyanate. The isocyanurates present in this case are more particularly tris-isocyanatoalkyl and/or tris-isocyanatocycloalkyl isocyanurates, which represent cyclic trimers of the diisocyanates, or are mixtures with their higher homologs containing more than one isocyanurate ring. The isocyanato-isocyanurates generally have an NCO content of 10% to 30% by weight, more particularly 15% to 25% by weight, and an average NCO functionality of 2.6 to 8.

2) Polyisocyanates containing uretdione groups and having aliphatically and/or cycloaliphatically attached isocyanate groups, preferably aliphatically and/or cycloaliphatically attached groups, and more particularly those derived from hexamethylene diisocyanate or isophorone diisocyanate. Uretdione diisocyanates are cyclic dimerization products of diisocyanates.

In the context of this invention, the polyisocyanates containing uretdione groups are obtained in a mixture with other polyisocyanates, more particularly those specified under 1). For that purpose, the diisocyanates may be reacted under conditions in which not only uretdione groups but also the other polyisocyanates are formed, or first of all the uretdione groups are formed and then are reacted to give the other polyisocyanates, or the diisocyanates are first reacted to give the other polyisocyanates, which are then reacted to form products containing uretdione groups.

3) Polyisocyanates containing urethane and/or allophanate groups and having aliphatically or cycloaliphatically attached isocyanate groups, as are obtained, for example, by reacting excess amounts of diisocyanate, such as hexamethylene diisocyanate or isophorone diisocyanate, for example, with monohydric or polyhydric alcohols. These polyisocyanates containing urethane and/or allophanate groups generally have an NCO content of 12% to 24% by weight and an average NCO functionality of 2.1 to 4.5. Polyisocyanates of this kind containing urethane and/or allophanate groups may be prepared without catalysis or, preferably, in the presence of catalysts, such as, for example, ammonium carboxylates or ammonium hydroxides, or allophanatization catalysts, e.g., Zn(II) compounds, in each case in the presence of monohydric, dihydric or polyhydric, preferably monohydric, alcohols. The polyisocyanates containing urethane and/or allophanate groups may also be prepared in a mixture with other polyisocyanates, more particularly those specified under 1).

4) Uretonimine-modified polyisocyanates.
5) Carbodiimide-modified polyisocyanates.
6) Hyperbranched polyisocyanates, of the kind known, for example, from DE-A1 10013186 or DE-A1 10013187.
7) Polyurethane-polyisocyanate prepolymers, from di- and/or polyisocyanates with alcohols.
8) Polyurea polyisocyanate prepolymers.
9) Hydrophilically modified polyisocyanates, i.e., polyisocyanates which in addition to the groups described under 1-10 comprise those groups which are formed formally by addition of molecules with NCO-reactive groups and hydrophilicizing groups onto the isocyanate groups of above molecules. The latter groups are nonionic groups such as alkyl-polyethylene oxide and/or ionic groups, derived, for example, from phosphoric acid, phosphonic acid, sulfuric acid or sulfonic acid, and/or their salts.
10) Polyisocyanates comprising iminooxadiazinedione groups, derived preferably from hexamethylene diisocyanate or isophorone diisocyanate. Polyisocyanates of this kind comprising iminooxadiazinedione groups are preparable from diisocyanates by means of specific catalysts.

In preferred compounds (a1) the polyisocyanate comprises at least one moiety selected from the group consisting of isocyanurates, biurets, and allophanates, preferably from the group consisting of isocyanurates and allophanates, as described in WO 00/39183, which is hereby considered by reference to be part of the present disclosure; with particular preference the compound in question is a polyisocyanate containing isocyanurate groups.

In one particularly preferred embodiment the polyisocyanate (a1) is a polyisocyanate based on 1,6-hexamethylene diisocyanate and/or isophorone diisocyanate, very preferably based on isophorone diisocyanate.

More particularly the compound (a1) is a polyisocyanate which comprises isocyanurate groups and is based on isophorone diisocyanate.

Preferred compounds (b1) comprise as polyisocyanate at least one moiety selected from the group consisting of isocyanurates, biurets and allophanates based on 1,6-hexamethylene diisocyanate, preferably from the group consisting of isocyanates and allophanates, as described in WO 00/39183, hereby considered by reference to be part of the present disclosure; with particular preference the compound in question is a polyisocyanate which comprises isocyanurate groups and is based on 1,6-hexamethylene diisocyanate.

Components (a2) and (b2)

Components (a2) and (b2) each comprise, independently of one another, at least one, for example one to three, preferably one to two, and very preferably just one compound having at least one, preferably just one, group that is reactive toward isocyanate groups, and at least one free-radically polymerizable C=C double bond.

Preferred compounds of components (a2) and (b2) are, for example, the esters of dihydric or polyhydric alcohols with α,β-ethylenically unsaturated monocarboxylic and/or dicarboxylic acids and their anhydrides. Examples of α,β-ethylenically unsaturated monocarboxylic and/or dicarboxylic acids and their anhydrides that can be used include acrylic acid, methacrylic acid, fumaric acid, maleic acid, maleic anhydride, crotonic acid, itaconic acid, etc. Preference is given to using acrylic acid and methacrylic acid, more preferably acrylic acid.

Suitable alcohols are, for example, diols such as ethylene glycol, 1,2-propanediol, 1,3-propanediol, 1,1-dimethylethane-1,2-diol, 2-butyl-2-ethyl-1,3-propanediol, 2-ethyl-1,3-propanediol, 2-methyl-1,3-propanediol, neopentylglycol, neopentylglycol hydroxypivalate, 1,2-, 1,3- or 1,4-butanediol, 1,6-hexanediol, 1,10-decanediol, bis-(4-hydroxycyclohexane)isopropylidene, tetramethylcyclobutanediol, 1,2-, 1,3- or 1,4-cyclohexanediol, cyclooctanediol, norbornanediol, pinanediol, decalindiol, 2-ethyl-1,3-hexanediol, 2,4-diethyloctane-1,3-diol, hydroquinone, bisphenol A, bisphenol F, bisphenol B, bisphenol S, 2,2-bis(4-hydroxycyclohexyl)propane, 1,1-, 1,2-, 1,3-, and 1,4-cyclohexanedimethanol, 1,2-, 1,3- or 1,4-cyclohexanediol, and tricyclodecanedimethanol.

Suitable triols and polyols have, for example, 3 to 25, preferably 3 to 18, carbon atoms. They include, for example trimethylolbutane, trimethylolpropane, trimethylolethane, pentaerythritol, glycerol, ditrimethylolpropane, dipentaerythritol, ditrimethylolpropane, sorbitol, mannitol, diglycerol, threitol, erythritol, adonitol (ribitol), arabitol (lyxitol), xylitol, dulcitol (galactitol), maltitol or isomalt.

Preferably the compounds of components (a2) and (b2) are selected from 2-hydroxyethyl acrylate, 2-hydroxyethyl methacrylate, 2-hydroxypropyl acrylate, 2-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, trimethylolpropane mono- or -diacrylate, pentaerythritol diacrylate or triacrylate, dipentaerythritol pentaacrylate, and mixtures thereof.

Preferred in particular as compounds (a2) or (b2) are 2-hydroxyethyl acrylate, 2-hydroxyethyl methacrylate, 2-hydroxypropyl acrylate, 2-hydroxypropyl methacrylate, pentaerythritol triacrylate, and dipentaerythritol pentaacrylate.

Preferred compounds (a2) are 2-hydroxyethyl acrylate, 2-hydroxyethyl methacrylate, pentaerythritol triacrylate, and dipentaerythritol pentaacrylate; particular preference is given to 2-hydroxyethyl acrylate and pentaerythritol triacrylate, and very particular preference to pentaerythritol triacrylate.

Preferred compounds (b2) are 2-hydroxyethyl acrylate, 2-hydroxyethyl methacrylate, and 2-hydroxypropyl acrylate; particular preference is given to 2-hydroxyethyl acrylate and 2-hydroxyethyl methacrylate, and very particular preference to 2-hydroxyethyl acrylate.

Components a3) and b3)

The optional components a3) and b3) comprise at least one compound having at least two groups that are reactive toward isocyanate groups, selected from hydroxyl, mercapto, primary and/or secondary amino groups, preferably hydroxyl and primary amino groups, more preferably hydroxyl groups.

Low molecular weight alcohols a3) and b3) have a molecular weight of not more than 500 g/mol. Particularly preferred are alcohols having 2 to 20 carbon atoms and, for example, 2 to 6 hydroxyl groups, preferably 2 to 4, more preferably 2 to 3, and very preferably just 2 hydroxyl groups. Preference is given in particular to hydrolysis-stable short-chain diols having 4 to 20, preferably 6 to 12, carbon atoms. These include preferably 1,1-, 1,2-, 1,3- or 1,4-di(hydroxymethyl)cyclohexane, 2,2-bis(4'-hydroxy-cyclohexyl)propane, 1,2-, 1,3- or 1,4-cyclohexanediol, tetramethylcyclobutanediol, cyclooctanediol or norbornanediol. Particular preference is given to using aliphatic hydrocarbon-diols, such as the isomeric butanediols, pentanediols, hexanediols, heptanediols, octanediols, nonanediols, decanediols, undecanediols and dodecanediols. Particular preference is given to 1,2-, 1,3- or 1,4-butanediol, 1,4-pentanediol, 1,5-pentanediol, 1,6-hexanediol, 2,5-hexanediol, di(hydroxymethyl)cyclohexane isomers and 2,2-bis(4'-hydroxycyclohexyl)propane. With very particular preference the diols (a3) are cycloaliphatic diols, more particularly 1,1-, 1,2-, 1,3- or 1,4-di(hydroxymethyl)cyclohexane, 2,2-bis(4'-hydroxycyclohexyl)propane, 1,2-, 1,3- or 1,4-cyclohexanediol.

Components a4) and b4)

Suitable compounds a4) and, independently thereof, b4) are also polymeric polyols. The number-average molecular weight $M_n$ of these polymers is preferably in a range from about 500 to 100 000, more preferably 500 to 10 000. The OH numbers are situated preferably in a range from about 20 to 300 mg KOH/g polymer.

Preferred compounds a4) and b4) are polyesterols, polyetherols, and polycarbonate polyols, more preferably polyesterols and polyetherols, and very preferably polyesterols.

Preferred polyesterols are those based on aliphatic, cycloaliphatic and/or aromatic dicarboxylic, tricarboxylic and polycarboxylic acids with diols, triols and/or polyols, and also lactone-based polyesterols.

Polyesterpolyols, are known, for example, from Ullmanns Encyklopädie der technischen Chemie, 4th edition, volume 19, pp. 62 to 65. Preference is given to using polyesterpolyols obtained by reaction of dihydric alcohols with dibasic carboxylic acids. Instead of the free polycarboxylic acids it is also possible to use the corresponding polycarboxylic anhydrides or corresponding polycarboxylic esters of lower alcohols or mixtures thereof to prepare the polyesterpolyols. The polycarboxylic acids may be aliphatic, cycloaliphatic, araliphatic, aromatic or heterocyclic, and if desired may be substituted, by halogen atoms, for example, and/or unsaturated. Examples thereof that may be mentioned include the following:

oxalic acid maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, subberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, their isomers and hydrogenation products, and their esterifiable derivatives, such as anhydrides or dialkylesters, for example, $C_1$-$C_4$ alkyl esters, preferably methyl, ethyl or n-butyl esters, of the stated acids are employed. Dicarboxylic acids of general formula HOOC—$(CH_2)_y$—COOH are preferred, where y is a number from 1 to 20, preferably an even number from 2 to 20; particular preference is given to succinic acid, adipic acid, sebacic acid, and dodecanedicarboxylic acid.

Suitable polyhydric alcohols for preparing the polyesterols include 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, poly-THF with a molar mass between 162 and 2000, poly-1,3-propanediol with a molar mass between 134 and 2000, poly-1,2-propanediol with a molar mass between 134 and 2000, polyethylene glycol with a molar mass between 106 and 2000, neopentylglycol, neopentylglycol hydroxypivalate, 2-ethyl-1,3-propanediol, 2-methyl-1,3-propanediol, 2,2-bis(4-hydroxy-cyclohexyl)propane, 1,1-, 1,2-, 1,3-, and 1,4-cyclohexanedimethanol, 1,2-, 1,3- or 1,4-cyclohexanediol, trimethylolbutane, trimethylolpropane, trimethylolethane, neopentylglycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt, which if desired may be alkoxylated as described above.

Preference is given to alcohols of the general formula HO—$(CH_2)_x$—OH, where x is a number from 1 to 20, preferably an even number from 2 to 20. Preferred are ethylene glycol, butane-1,4-diol, hexane-1,6-diol, octane-1,8-diol, and dodecane-1,12-diol. Additionally preferred is neopentylglycol.

Also suitable, furthermore, are polycarbonate-diols, of the kind obtainable, for example, by reacting phosgene with an excess of the low molecular weight alcohols stated as synthesis components for the polyesterpolyols.

Lactone-based polyesterdiols are also suitable, these being homopolymers or copolymers of lactones, preferably hydroxyl-terminated adducts of lactones with suitable difunctional starter molecules. Suitable lactones are preferably those deriving from compounds of the general formula HO—$(CH_2)_z$—COOH, where z is a number from 1 to 20, and where one H atom of a methylene unit may also have been substituted by a $C_1$ to $C_4$ alkyl radical. Examples are ε-caprolactone, β-propiolactone, gamma-butyrolactone and/or methyl-ε-caprolactone, 4-hydroxybenzoic acid, 6-hydroxy-2-naphthoic acid or pivalolactone, and mixtures thereof. Examples of suitable starter components are the low molecular weight dihydric alcohols specified above as a synthesis component for the polyesterpolyols. The corresponding polymers of ε-caprolactone are particularly preferred. Lower polyesterdiols or polyetherdiols may also be used as starters for preparing the lactone polymers. Instead of the polymers of lactones it is also possible to use the corresponding, chemically equivalent polycondensates of the hydroxycarboxylic acids corresponding to the lactones.

In the case of the lactone-based polyesterol, preference is given to a polycaprolactone diol, which, formally, is an adduct of caprolactone with a diol HO—R—OH, and which has the formula

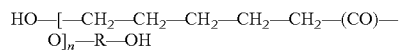

or

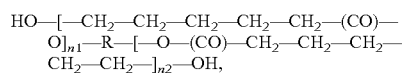

in which n, n1, and n2 are positive integers, for which n=1 to 5 and (n1+n2)=1 to 5 and R is a divalent aliphatic or cycloaliphatic radical having at least one carbon atom, preferably 2 to 20, more preferably 2 to 10, very preferably 3 to 6 carbon atoms.

Aliphatic radicals R are, for example, linear or branched alkylene, e.g., methylene, 1,2-ethylene, 1,2- or 1,3-propylene, 1,2-, 1,3- or 1,4-butylene, 1,1-dimethyl-1,2-ethylene or 1,2-dimethyl-1,2-ethylene, 1,5-pentylene, 1,6-hexylene, 1,8-octylene, 1,10-decylene, or 1,12-dodecylene. Preference is given to 1,2-ethylene, 1,2- or 1,3-propylene, 1,4-butylene and 1,5-pentylene, particular preference to 1,4-butylene and 1,6-hexylene.

Conceivable, albeit less preferably, are cycloaliphatic radicals, examples being cyclopropylene, cyclopentylene, cyclohexylene, cyclooctylene, and cyclododecylene.

Preferred polyesterols as compounds (a4) and (b4) have a functionality in terms of free hydroxyl groups of at least 2, more preferably of 2 to 6, very preferably of 2 to 4, more particularly of 2 to 3, and especially of 2 exactly.

The molecular weights $M_n$ of the polyesterols lie preferably between 500 and 4000 ($M_n$ determined by gel permeation chromatography with polystyrene as standard and tetrahydrofuran as eluent).

Preferred compounds (b4) are polyesterdiols synthesized exclusively from aliphatic or cycloaliphatic building blocks, more preferably exclusively from aliphatic building blocks. Especially preferred are those polyesterdiols as compounds (b4) which comprise at least partly, preferably completely adipic acid in copolymerized form as an acid building block, and alkanediols in copolymerized form as an alcohol building block. More particularly preferred compounds (b4) are those polyesterdiols which have a number-average molecular weight Mn of at least 1500.

Components (a5) and (b5)

Suitable components (a5) and (b5) are, in each case independently of one another, compounds having at least one, for example one to three, preferably one or two isocyanate-reactive groups and at least one, preferably just one, dispersive group.

The dispersive groups are, in accordance with the invention, anionic groups or groups which can be converted into an anionic group.

In accordance with the invention the compounds (a5) and (b5) are compounds which comprise no polymerizable C—C bonds.

Compounds (a5) and (b5) comprise at least one, preferably 1 to 3, more preferably 1 to 2, very preferably just one or just 2 groups that are reactive toward isocyanate groups, and at least one, preferably just one, anionic group or hydrophilic group which can be converted into an anionic group. The compounds in question here are, for example, those as described in EP-A1 703 255, particularly from page 3 line 54 to page 4 line 38 therein, in DE-A1 197 24 199, in particular from page 3 line 4 to line 30 therein, in DE-A1 40 10 783, particularly from column 3 line 3 to line 40 therein, in DE-A1 41 13 160, in particular from column 3 line 63 to column 4 line 4 therein, and in EP-A2 548 669, in particular from page 4 line 50 to page 5 line 6 therein. Reference is hereby made expressly to these specifications in the context of the present disclosure.

Preferred compounds (a5) and (b5) are those having the general formula

in which

RG is at least one isocyanate-reactive group,

DG is at least one dispersive group, and $R^9$ is an aliphatic, cycloaliphatic or aromatic radical comprising 1 to 20 carbon atoms.

Examples of isocyanate-reactive groups RG are —OH, —SH, —NH$_2$ or —NHR$^{10}$, in which R$^{10}$ can be $C_1$ to $C_4$ alkyl, for example, methyl, ethyl, isopropyl, n-propyl, n-butyl, isobutyl, sec-butyl, tert-butyl, preferably methyl, ethyl, n-butyl or tert-butyl, more preferably methyl or n-butyl, and very preferably methyl; preference is given to —OH, —NH$_2$ or —NHR$^{10}$, more preference to —OH or —NH$_2$, and very particular preference to —OH.

Examples of DG are —COOH, —SO$_3$H or —PO$_3$H, and also their anionic forms, with which any desired counterion may be associated, examples being Li$^+$, Na$^+$, K$^+$, Cs$^+$, Mg$^{2+}$, Ca$^{2+}$ or Ba$^{2+}$. Other possible associated counterions are the quaternary ammonium ions or those ammonium ions that are derived from ammonia or amines, especially tertiary amines, such as, for example, ammonium, methylammonium, dimethylammonium, trimethylammonium, ethylammonium, diethylammonium, triethylammonium, tributylammonium, diisopropylethylammonium, benzyldimethylammonium, monoethanolammonium, diethanolammonium, triethanolammonium, hydroxyethyldimethylammonium, hydroxyethyldiethylammonium, monopropanolammonium, dipropanolammonium, tripropanolammonium, piperidinium, piperazinium, N,N'-dimethylpiperazinium, morpholinium, pyridinium, tetramethylammonium, triethylmethylammonium, 2-hydroxyethyltrimethylammonium, bis(2-hydroxyethyl)dimethylammonium or tris(2-hydroxyethyl)methylammonium.

$R^9$ is preferably methylene, 1,2-ethylene, 1,2-propylene, 1,3-propylene, 1,2-butylene, 1,4-butylene, 1,3-butylene, 1,6-hexylene, 1,8-octylene, 1,12-dodecylene, 1,2-phenylene, 1,3-phenylene, 1,4-phenylene, 1,2-naphthylene, 1,3-naphthylene, 1,4-naphthylene, 1,6-naphthylene, 1,2-cyclopentylene, 1,3-cyclopentylene, 1,2-cyclohexylene, 1,3-cyclohexylene or 1,4-cyclohexylene.

Components (a5) and (b5) independently of one another are preferably, for example, hydroxyacetic acid, tartaric acid, lactic acid, 3-hydroxypropionic acid, hydroxypivalic acid, dimethylolpropionic acid, dimethylolbutyric acid, trimethylolacetic acid, mercaptoacetic acid, mercaptopropionic acid, thiolactic acid, mercaptosuccinic acid, glycine, iminodiacetic acid, sarcosine, alanine, β-alanine, leucine, isoleucine, aminobutyric acid, hydroxysuccinic acid, hydroxydecanoic acid, ethylene-diaminetriacetic acid, hydroxydodecanoic acid, hydroxyhexadecanoic acid, 12-hydroxystearic acid, aminonaphthalenecarboxylic acid, hydroxyethanesulfonic acid, hydroxypropanesulfonic acid, mercaptoethanesulfonic acid, mercaptopropanesulfonic acid, aminomethanesulfonic acid, taurine, aminopropanesulfonic acid, N-alkylated or N-cycloalkylated aminopropanesulfonic or aminoethanesulfonic acids, examples being N-cyclohexylaminoethanesulfonic acid or N-cyclohexylaminopropanesulfonic acid, and also their alkali metal salts, alkaline earth metal salts or ammonium salts, and with particular preference the stated dihydroxy- and monohydroxycarboxylic acids.

For preparing the dispersion, the aforementioned acids, if not already in salt form, are partially or completely neutralized, preferably with alkali metal salts or amines, preferably tertiary amines.

Preferred tertiary amines are triethylamine, tri-n-butylamine, benzyldimethylamine, dimethylethanolamine, N-methyldiethanolamine, N-methylmorpholine, and ethyldiisopropylamine.

Preferably 10 to 100 mol % of the acid groups, carboxyl groups preferably, that are present in the compounds (a5) and (b5) are neutralized, more preferably 40 to 100 mol %, and very preferably 60 to 100 mol %.

In one preferred embodiment the compounds (a5) and/or (b5) are incorporated in their acidic form, i.e., protonated form, into the polyurethanes and are neutralized only after the polyurethanes have been prepared, but before or during, preferably before, the act of dispersing in water.

Preference as compounds (a5) and (b5) is given independently of one another to dimethylolpropionic acid, glycolic acid, and thioglycolic acid.

Particularly preferred as compound (a5) are glycolic acid and thioglycolic acid.

Particularly preferred as compound (b5) is dimethylolpropionic acid.

Components (a6) and (b6)

In the polyurethanes and polyurethane dispersions of the invention it is possible as optional components (a6) and (b6) to use at least one further compound having just one group that is reactive toward isocyanate groups. That group may be a hydroxyl group, mercapto group, or primary or secondary amino group. Suitable compounds (a6)/(b6) are the customary compounds, known to the skilled worker, which are used typically in polyurethane preparation as what are called stoppers, for lowering the number of reactive free isocyanate groups or for modifying the polyurethane properties. These include, for example, monofunctional alcohols, such as methanol, ethanol, n-propanol, isopropanol, n-butanol etc. Suitable components (a6) and (b6) are also amines having a primary or secondary amino group, such as methylamine, ethylamine, n-propylamine, diisopropylamine, dimethylamine, diethylamine, di-n-propylamine, diisopropylamine, etc.

Components (a7) and (b7)

In the polyurethanes and polyurethane dispersions of the invention it is possible as optional components (a7) and (b7) to use at least one diisocyanate or polyisocyanate which is different from the incorporated compounds of components (a1) and (b1). As components (a7) and (b7) it is preferred not to use polyisocyanates in which the isocyanate groups have been reacted with a blocking agent.

Preferred compounds (a7) and (b7) are di- or polyisocyanates having an NCO functionality of 2 to 4.5, more preferably 2 to 3.5. As components (a7) and (b7) it is preferred to use aliphatic, cycloaliphatic and araliphatic diisocyanates. These may be, for example, the diisocyanates set out above under (a1) and (b1), but are different from the compound (a1) and (b1) actually used in the polyurethane. Preferred compounds (a7) and (b7) are those which in addition to 2 or more isocyanate groups also contain a group selected from the group of urethane, urea, biuret, allophanate, carbodiimide, uretonimine, uretdione, and isocyanurate groups.

These are, for example, the polyisocyanates described above under (a1) and (b1), as identified with the numbers 1) to 10), or mixtures thereof.

As component (a7) and (b7) it is preferred to use 1,6-hexamethylene diisocyanate, isophorone diisocyanate, 1,3- and 1,4-bis(isocyanatomethyl)cyclohexane, their Isocyanurates, biurets, and mixtures thereof.

Where the dispersions of the invention comprise, as well as components (a1) and (b1), a component (a7) and/or (b7), the fraction of the compounds of component (a7) and/or (b7) is preferably 0.1% to 90%, more preferably 1% to 50%, more particularly 5% to 30%, by weight, based on the total amount of the compounds of components (a1) and (a7) and, respectively, (b1) and (b7).

In one preferred embodiment, apart from components (a1) and (b1), no further component (a7) and (b7) is incorporated into the polyurethanes (A) and (B), respectively.

Component (C)

The mixture of polyurethanes (A) and (B) according to the invention may optionally comprise at least one further compound (C) such as is normally employed as a reactive diluent. These include, for example, the reactive diluents as described in P. K. T. Oldring (editor), Chemistry & Technology of UV & EB Formulations for Coatings, Inks & Paints, Vol. II, Chapter III: Reactive Diluents for UV & EB Curable Formulations, Wiley and SITA Technology, London 1997.

Component (C) is dispersed together with polyurethanes (A) and (B) in water.

Preferred reactive diluents are compounds different from component (a2) or (b2) which have at least one free-radically polymerizable C=C double bond.

Examples of reactive diluents include esters of (meth)acrylic acid with alcohols which have 1 to 20 C atoms, e.g., methyl(meth)acrylate, ethyl(meth)acrylate, butyl(meth)acrylate, 2-ethylhexyl(meth)acrylate, 2-hydroxyethyl acrylate, 4-hydroxybutyl acrylate, dihydrodicyclopentadienyl acrylate, vinylaromatic compounds, e.g., styrene, divinylbenzene, $\alpha,\beta$-unsaturated nitriles, e.g., acrylonitrile, methacrylonitrile, $\alpha,\beta$-unsaturated aldehydes, e.g., acrolein, methacrolein, vinyl esters, e.g., vinyl acetate, vinyl propionate, halogenated ethylenically unsaturated compounds, e.g., vinyl chloride, vinylidene chloride, conjugated unsaturated compounds, e.g., butadiene, isoprene, chloroprene, monounsaturated compounds, e.g., ethylene, propylene, 1-butene, 2-butene, isobutene, cyclic monounsaturated compounds, e.g., cyclopentene, cyclohexene, cyclododecene, N-vinylformamide, allylacetic acid, vinylacetic acid, monoethylenically unsaturated carboxylic acids having 3 to 8 C atoms and also their water-soluble alkali metal, alkaline earth metal or ammonium salts, such as, for example: acrylic acid, methacrylic acid, dimethylacrylic acid, ethacrylic acid, maleic acid, citraconic acid, methylenemalonic acid, crotonic acid, fumaric acid, mesaconic acid, and itaconic acid, maleic acid, N-vinylpyrrolidone, N-vinyl lactams, such as N-vinylcaprolactam, N-vinyl-N-alkylcarboxamides or N-vinylcarboxamides, such as N-vinylacetamide, N-vinyl-N-methylformamide, and N-vinyl-N-methylacetamide or vinyl ethers, e.g., methyl vinyl ether, ethyl vinyl ether, n-propyl vinyl ether, isopropyl vinyl ether, n-butyl vinyl ether, sec-butyl vinyl ether, isobutyl vinyl ether, tert-butyl vinyl ether, 4-hydroxybutyl vinyl ether, and mixtures thereof.

Compounds having at least two free-radically polymerizable C=C double bonds: these include, in particular, the diesters and polyesters of the aforementioned $\alpha,\beta$-ethylenically unsaturated monocarboxylic and/or dicarboxylic acids with diols or polyols. Particularly preferred are hexanediol diacrylate, hexanediol dimethacrylate, octanediol diacrylate, octanediol dimethacrylate, nonanediol diacrylate, nonanediol dimethacrylate, decanediol diacrylate, decanediol dimethacrylate, pentaerythritol diacrylate, di pentaerythritol tetraacrylate, di pentaerythritol triacrylate, pentaerythritol tetraacrylate, etc. Also preferred are the esters of alkoxylated polyols, with $\alpha,\beta$-ethylenically unsaturated monocarboxylic and/or dicarboxylic acids, such as the polyacrylates or polymethacrylates of alkoxylated trimethylolpropane, glycerol or pentaerythritol. Additionally suitable are the esters of alicyclic diols, such as cyclohexanediol di(meth)acrylate and bis(hydroxymethylethyl)cyclohexane di(meth)acrylate. Further suitable reactive diluents are trimethylolpropane monoformal acrylate, glycerol formal acrylate, 4-tetrahydropyranyl acrylate, 2-tetrahydropyranyl methacrylate, and tetrahydrofurfuryl acrylate.

Further suitable reactive diluents are for example urethane (meth)acrylates, epoxy(meth)acrylates, polyether(meth)acrylates, polyester(meth)acrylates or polycarbonate(meth)acrylates.

Urethane(meth)acrylates

Urethane(meth)acrylates are obtainable for example by reacting polyisocyanates with hydroxyalkyl(meth)acrylates or hydroxyalkyl vinyl ethers and, if appropriate, chain extenders such as diols, polyols, diamines, polyamines, dithiols or polythiols.

Urethane(meth)acrylates of this kind comprise as synthesis components substantially:

(1) at least one organic aliphatic, aromatic or cycloaliphatic di- or polyisocyanate, such as those listed above under (a1) and (b1), for example (2) at least one compound having at least one isocyanate-reactive group and at least one free-radically polymerizable unsaturated group, such as those listed under (a2) and (b2), for example, and (3) if desired, at least one compound having at least two isocyanate-reactive groups, such as those listed under (a3) and (b3), for example.

Components (1), (2), and (3) may be the same as those described above for the polyurethanes (A) and (B) of the invention.

The urethane(meth)acrylates preferably have a number-average molar weight $M_n$ of 500 to 20 000, in particular of 500 to 10 000 and more preferably 600 to 3000 g/mol (determined by gel permeation chromatography using tetrahydrofuran and polystyrene as standard).

The urethane(meth)acrylates preferably have a (meth) acrylic group content of 1 to 5, more preferably of 2 to 4, mol per 1000 g of urethane(meth)acrylate.

Particularly preferred urethane(meth)acrylates have an average OH functionality of 1.5 to 4.5.

Epoxy(meth)acrylates

Epoxy(meth)acrylates are preferably obtainable by reacting epoxides with (meth)acrylic acid. Examples of suitable epoxides include epoxidized olefins, aromatic glycidyl ethers or aliphatic glycidyl ethers, preferably those of aromatic or aliphatic glycidyl ethers.

Examples of possible epoxidized olefins include ethylene oxide, propylene oxide, isobutylene oxide, 1-butene oxide, 2-butene oxide, vinyloxirane, styrene oxide or epichlorohydrin, preference being given to ethylene oxide, propylene oxide, isobutylene oxide, vinyloxirane, styrene oxide or epichlorohydrin, particular preference to ethylene oxide, propylene oxide or epichlorohydrin, and very particular preference to ethylene oxide and epichlorohydrin.

Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g., 2,5-bis[(2,3-epoxy-propoxy)phenyl]octahydro-4,7-methano-5H-indene) (CAS No. [13446-85-0]), tris[4-(2,3-epoxypropoxy)phenyl]methane isomers (CAS No. [66072-39-7]), phenol-based epoxy novolaks (CAS No. [9003-35-4]), and cresol-based epoxy novolaks (CAS No. [37382-79-9]).

Preference is given to bisphenol A diglycidyl ether, bisphenol F diglycidyl ether, bisphenol B diglycidyl ether, and bisphenol S diglycidyl ether, and bisphenol A diglycidyl ether is particularly preferred.

Examples of aliphatic glycidyl ethers include 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl]ethane (CAS No. [27043-37-4]), diglycidyl ether of polypropylene glycol (α,ω-bis(2,3-epoxypropoxy)-poly(oxypropylene) (CAS No. [16096-30-3]) and of hydrogenated bisphenol A (2,2-bis[4-(2,3-epoxypropoxy)cyclohexyl]propane, CAS No. [13410-58-7]).

Preference is given to 1,4-butanediol diglycidyl ether, 1,6-hexanediol diglycidyl ether, trimethylolpropane triglycidyl ether, pentaerythritol tetraglycidyl ether, and 2,2-bis[4-(2,3-epoxypropoxy)cycloxexyl]propane.

The abovementioned aromatic glycidyl ethers are particularly preferred.

The epoxy(meth)acrylates and epoxy vinyl ethers preferably have a number-average molar weight $M_n$ of 200 to 20 000, more preferably of 200 to 10 000 g/mol, and very preferably of 250 to 3000 g/mol; the amount of (meth)acrylic or vinyl ether groups is preferably 1 to 5, more preferably 2 to 4, per 1000 g of epoxy(meth)acrylate or vinyl ether epoxide (determined by gel permeation chromatography using polystyrene as standard and tetrahydrofuran as eluent).

Preferred epoxy(meth)acrylates have an OH number of 40 to 400 mg KOH/g.

Preferred epoxy(meth)acrylates have an average OH functionality of 1.5 to 4.5.

Particularly preferred epoxy(meth)acrylates are those such as are obtained from processes in accordance with EP-A-54 105, DE-A 33 16 593, EP-A 680 985, and EP-A-279 303, in which in a first stage a (meth)acrylic ester is prepared from (meth)acrylic acid and hydroxy compounds and in a second stage excess (meth)acrylic acid is reacted with epoxides.

Polyester(meth)acrylates

Suitable polyester(meth)acrylates are at least partly or, preferably, completely (meth)acrylated reaction products of polyesterols of the kind listed above under compounds (a4) and (b4).

Carbonate(meth)acrylates

Carbonate(meth)acrylates comprise on average preferably 1 to 5, especially 2 to 4, more preferably 2 to 3 (meth)acrylic groups, and very preferably 2 (meth)acrylic groups.

The number-average molecular weight $M_n$ of the carbonate (meth)acrylates is preferably less than 3000 g/mol, more preferably less than 1500 g/mol, very preferably less than 800 g/mol (determined by gel permeation chromatography using polystyrene as standard, tetrahydrofuran as solvent).

The carbonate(meth)acrylates are obtainable in a simple manner by transesterifying carbonic esters with polyhydric, preferably dihydric, alcohols (diols, hexanediol for example) and subsequently esterifying the free OH groups with (meth) acrylic acid, or else by transesterification with (meth)acrylic esters, as described for example in EP-A 92 269. They are also obtainable by reacting phosgene, urea derivatives with polyhydric, e.g., dihydric, alcohols.

In an analogous way it is also possible to obtain vinyl ether carbonates, by reacting a hydroxyalkyl vinyl ether with carbonic esters and also, if appropriate, with dihydric alcohols.

Also conceivable are (meth)acrylates or vinyl ethers of polycarbonate polyols, such as the reaction product of one of the aforementioned diols or polyols and a carbonic ester and also a hydroxyl-containing (meth)acrylate or vinyl ether.

Examples of suitable carbonic esters include ethylene carbonate, 1,2- or 1,3-propylene carbonate, dimethyl carbonate, diethyl carbonate or dibutyl carbonate.

Examples of suitable hydroxyl-containing (meth)acrylates are 2-hydroxyethyl(meth)acrylate, 2- or 3-hydroxypropyl (meth)acrylate, 1,4-butanediol mono(meth)acrylate, neopentyl glycol mono(meth)acrylate, glyceryl mono- and di(meth) acrylate, trimethylolpropane mono- and di(meth)acrylate, and pentaerythrityl mono-, -di-, and tri(meth)acrylate.

Suitable hydroxyl-containing vinyl ethers are, for example, 2-hydroxyethyl vinyl ether and 4-hydroxybutyl vinyl ether.

Particularly preferred carbonate(meth)acrylates are those of the formula:

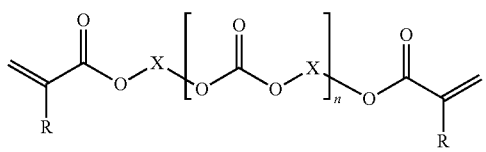

in which R is H or $CH_3$, X is a $C_2$-$C_{18}$ alkylene group, and n is an integer from 1 to 5, preferably 1 to 3.

R is preferably H and X is preferably $C_2$ to $C_{10}$ alkylene, examples being 1,2-ethylene, 1,2-propylene, 1,3-propylene, 1,4-butylene, and 1,6-hexylene, more preferably $C_4$ to $C_8$ alkylene. With very particular preference X is $C_6$ alkylene.

The carbonate(meth)acrylates are preferably aliphatic carbonate(meth)acrylates.

They further include customary polycarbonates known to the skilled worker and having terminal hydroxyl groups, which are obtainable, for example, by reacting the aforementioned diols with phosgene or carbonic diesters.

Polyether(meth)acrylates

Polyether(meth)acrylates are preferably (meth)acrylates of singly to viginptuply and more preferably triply to decuply ethoxylated, propoxylated or mixedly ethoxylated and propoxylated, and more particularly exclusively ethoxylated, neopentylglycol, trimethylolpropane, trimethylolethane or pentaerythritol.

In addition it is possible to use singly to viginptuply and more preferably triply to decuply ethoxylated, propoxylated or mixedly ethoxylated and propoxylated, and more particularly exclusively ethoxylated, glycerol.

Preferred polyfunctional, polymerizable compounds are ethylene glycol diacrylate, 1,2-propanediol diacrylate, 1,3-propanediol diacrylate, 1,4-butanediol diacrylate, 1,6-hexanediol diacrylate, trimethylolpropane triacrylate, pentaerythrityl tetraacrylate, polyesterpolyol acrylates, polyetherol acrylates, and triacrylate of singly to viginptuply alkoxylated, more preferably ethoxylated, trimethylolpropane.

Polyether(meth)acrylates may further be (meth)acrylates of polyTHF having a molar weight between 162 and 2000, poly-1,3-propanediol having a molar weight between 134 and 2000, or polyethylene glycol having a molar weight between 238 and 2000.

Where the dispersions of the invention are cured not with electron beams but instead by means of UV radiation, the preparations of the invention preferably comprise at least one photoinitiator which is able to initiate the polymerization of ethylenically unsaturated double bonds.

Photoinitiators may be, for example, photoinitiators known to the skilled worker, examples being those specified in "Advances in Polymer Science", Volume 14, Springer Berlin 1974 or in K. K. Dietliker, Chemistry and Technology of UV and EB Formulation for Coatings, Inks and Paints, Volume 3; Photoinitiators for Free Radical and Cationic Polymerization, P. K. T. Oldring (Eds), SITA Technology Ltd, London.

Suitability is possessed by those photoinitiators as described in WO 2006/005491 A1, page 21 line 18 to page 22 line 2 (corresponding to US 2006/0009589 A1, paragraph [0150]), which is hereby considered part of the present disclosure through reference.

Also suitable are nonyellowing or low-yellowing photoinitiators of the phenylglyoxalic ester type, as described in DE-A 198 26 712, DE-A 199 13 353 or WO 98/33761.

Typical mixtures comprise, for example, 2-hydroxy-2-methyl-1-phenylpropan-2-one and 1-hydroxycyclohexyl phenyl ketone, bis(2,6-dimethoxybenzoyl)-2,4,4-trimethylpentylphosphine oxide and 2-hydroxy-2-methyl-1-phenylpropan-1-one, benzophenone and 1-hydroxycyclohexyl phenyl ketone, bis(2,6-dimethoxybenzoyl)-2,4,4-trimethylpentylphosphine oxide and 1-hydroxycyclohexyl phenyl ketone, 2,4,6-trimethylbenzoyldiphenylphosphine oxide and 2-hydroxy-2-methyl-1-phenylpropan-1-one, 2,4,6-trimethylbenzophenone and 4-methylbenzophenone or 2,4,6-trimethylbenzophenone, and 4-methylbenzophenone and 2,4,6-trimethylbenzoyldiphenylphosphine oxide.

Preference among these photoinitiators is given to 2,4,6-trimethylbenzoyldiphenylphosphine oxide, ethyl 2,4,6-trimethylbenzoylphenylphosphinate, bis(2,4,6-tri-methylbenzoyl)phenylphosphine oxide, benzophenone, 1-hydroxycyclohexyl phenyl ketone, 1-benzoylcyclohexan-1-ol, 2-hydroxy-2,2-dimethylacetophenone, 2,2-dimethoxy-2-phenylacetophenone, and mixtures thereof.

The dispersions of the invention comprise the photoinitiators preferably in an amount of 0.05% to 10%, more preferably 0.1% to 8%, in particular 0.2% to 5%, by weight based on the total amount of polyurethanes (A) and (B).

The dispersions of the invention may comprise further customary coatings additives, such as flow control agents, defoamers, UV absorbers, sterically hindered amines (HALS), plasticizers, antisettling agents, dyes, pigments, antioxidants, activators (accelerants), antistatic agents, flame retardants, thickeners, thixotropic agents, surface-active agents, viscosity modifiers, plastifying agents or chelating agents and/or fillers.

The polyurethanes (A) and (B) of the invention may comprise 0% to 10% by weight, based on the sum of the compounds (A) and (B), of at least one UV stabilizer.

Suitable stabilizers comprise typical UV absorbers such as oxanilides, triazines, preferably hydroxyphenyltriazine, and benzotriazole (the latter obtainable as Tinuvin® grades from Ciba-Spezialitatenchemie), and benzophenones.

These stabilizers can be used alone or together with, based on the sum of the compounds (A) and (B), additionally 0% to 5% by weight of suitable free-radical scavengers, examples being sterically hindered amines such as 2,2,6,6-tetramethylpiperidine, 2,6-di-tert-butylpiperidine or derivatives thereof, e.g., bis(2,2,6,6-tetramethyl-4-piperidyl) sebacinate or, preferably, bis(1,2,2,6,6-pentamethyl-4-piperidyl)sebacate.

Additionally it is possible for one or more thermally activable initiators to be added, examples being potassium peroxodisulfate, dibenzoyl peroxide, cyclohexanone peroxide, di-tert-butyl peroxide, azobisisobutyronitrile, cyclohexylsulfonyl acetyl peroxide, diisopropyl percarbonate, tert-butyl peroctoate or benzpinacol, and also, for example, those thermally activable initiators which have a half-life at 80° C. of more than 100 hours, such as di-tert-butyl peroxide, cumene hydroperoxide, dicumyl peroxide, tert-butyl perbenzoate, silylated pinacols, which are available commercially, for example, under the trade name ADDID 600 from Wacker, or amine N-oxides containing hydroxyl groups, such as 2,2,6,6-tetramethylpiperidine-N-oxyl, 4-hydroxy-2,2,6,6-tetramethylpiperidine-N-oxyl, etc.

Further examples of suitable initiators are described in "Polymer Handbook", 2nd ed., Wiley & Sons, New York.

Suitable thickeners, as well as free-radically (co)polymerized (co)polymers, include customary organic and inorganic thickeners such as hydroxymethylcellulose or bentonite.

Examples of chelating agents which can be used include ethylenediamineacetic acid and salts thereof, and also β-diketones.

Suitable fillers comprise silicates, e.g., silicates obtainable by hydrolysis of silicon tetrachloride, such as Aerosil R from Degussa, siliceous earth, talc, aluminum silicates, magnesium silicates, and calcium carbonates, etc. Suitable stabilizers comprise typical UV absorbers such as oxanilides, triazines, and benzotriazole (the latter obtainable as Tinuvin R grades from Ciba-Spezialitatenchemie), and benzophenones. They can be used alone or together with suitable free-radical scavengers, examples being sterically hindered amines such as 2,2,6,6-tetramethylpiperidine, 2,6-di-tert-butylpiperidine or derivatives thereof, e.g., bis(2,2,6,6-tetramethyl-4-piperidyl) sebacate. Stabilizers are used usually in amounts of 0.1% to 5.0% by weight, based on the "solid" components comprised in the preparation.

The inventive mixtures of polyurethanes (A) and (B) can be in the form of their aqueous dispersions, with a solids content within a range from about 5% to 70%, in particular 20% to 50% by weight.

The composition of the polyurethanes (A) of the invention per 100 mol % of reactive isocyanate groups in (a1) and (a7) (in total) is generally as follows:
- (a2) 30 to 95 mol %, preferably 40 to 92 mol %, more preferably 50 to 90 mol %, very preferably 60 to 80 mol %, and in particular 70 to 80 mol %,
- (a3) 0 to 30 mol %, preferably 0 to 25 mol %, more preferably 0 to 20 mol %, very preferably 0 to 15 mol %, in particular 0 to 10 mol %, and specifically 0 mol %,
- (a4) 0 to 10 mol %, preferably 0 to 8 mol %, more preferably 0 to 5 mol %, very preferably 0 to 3 mol %, and in particular 0 mol %,
- (a5) 5 up to 30 mol %, preferably 8 to 25 mol %, more preferably 10 to 20 mol %, very preferably 15 to 20 mol %, and in particular 18 to 20 mol %,
- (a6) up to 10 mol %, preferably up to 8 mol %, more preferably up to 5 mol %, very preferably up to 2 mol %, and in particular 0 mol %, based in each case on the isocyanate-reactive groups, with the proviso that the sum of all the isocyanate-reactive groups is 80 to 125 mol % of the reactive isocyanate groups in (a1) and (a7) (in total), preferably 85 to 115 mol %, more preferably 90 to 110 mol %, very preferably 95 to 105 mol %, and in particular 100 mol %.

The ratio of (a1) to (a7), based on the reactive isocyanate groups, is generally 1:0 to 1:2, preferably 1:0 to 1:1.5, more preferably 1:0 to 1:1.2, very preferably 1:0 to 1:1, in particular 1:0 to 1:0.5, and especially 1:0.

The composition of the polyurethanes (B) of the invention per 100 mol % of reactive isocyanate groups in (b1) and (b7) (in total) is generally as follows:
- (b2) 30 to 90 mol %, preferably 40 to 85 mol %, more preferably 50 to 80 mol %, very preferably 60 to 80 mol %, and in particular 70 to 80 mol %,
- (b3) 0 to 30 mol %, preferably 0 to 25 mol %, more preferably 0 to 20 mol %, very preferably 0 to 15 mol %, in particular 0 to 10 mol %, and specifically 0 mol %,
- (b4) 10 to 40 mol %, preferably 15 to 35 mol %, more preferably 20 to 30 mol %, and very preferably 20 to 25 mol %,
- (b5) 5 up to 30 mol %, preferably 8 to 25 mol %, more preferably 10 to 20 mol %, very preferably 15 to 20 mol %, and in particular 18 to 20 mol %,
- (b6) up to 10 mol %, preferably up to 8 mol %, more preferably up to 5 mol %, very preferably up to 2 mol %, and in particular 0 mol %, based in each case on the isocyanate-reactive groups, with the proviso that the sum of all the isocyanate-reactive groups is 80 to 125 mol % of the reactive isocyanate groups in (b1) and (b7) (in total), preferably 85 to 115 mol %, more preferably 90 to 110 mol %, very preferably 95 to 105 mol %, and in particular 100 mol %.

The ratio of (b1) to (b7), based on the reactive isocyanate groups, is generally 1:0 to 1:2, preferably 1:0 to 1:1.5, more preferably 1:0 to 1:1.2, very preferably 1:0 to 1:1, in particular 1:0 to 1:0.5, and especially 1:0.

The number-average molecular weight $M_n$ of the polyurethanes (A) and (B) of the invention, determined by gel permeation chromatography using tetrahydrofuran as eluent and polystyrene as standard, can amount for example to up to 50 000, preferably up to 30 000, more preferably up to 10 000, and in particular up to 5000.

One preferred embodiment of the present invention is when the polyurethane (B) has a higher number-average molecular weight than the polyurethane (A). For example, the polyurethane (B) preferably has a number-average molecular weight up to 5000 g/mol and the polyurethane (A) has a number-average molecular weight up to 2000 g/mol.

The isocyanate group content, calculated as NCO with the molecular weight 42 g/mol, is up to 5% by weight in the polyurethanes of the invention, preferably up to 3% by weight, more preferably up to 2% by weight, very preferably up to 1% by weight, and in particular up to 0.5% by weight. If blocked isocyanate groups are comprised then they are included in the calculation of the isocyanate group content.

The polyurethane (A) preferably has a glass transition temperature of more than 20° C., preferably more than 25° C.

The polyurethane (B) preferably has a glass transition temperature of not more than 10° C., preferably not more than 0° C. The glass transition temperature Tg is determined by the DSC method (Differential Scanning calorimetry) according to ASTM 3418/82 at a heating rate of 10° C./min.

For the preparation of the polyurethanes of the invention the starting components (a1) to (a7) and (b1) to b7), if used, are reacted with one another at temperatures of 40 to 180° C., preferably 50 to 150° C., while observing the NCO/OH equivalent ratio specified above.

The reaction generally takes place until the desired NCO number to DIN 53185 has been reached.

The reaction time is generally 10 minutes to 12 hours, preferably 15 minutes to 10 hours, more preferably 20 minutes to 8 hours, and very preferably 1 to 8 hours.

The reaction can if desired be accelerated using suitable catalysts.

The formation of the adduct of isocyanato-functional compound and the compound comprising groups that are reactive toward isocyanate groups takes place generally by mixing the components in any order, at elevated temperature if necessary.

Preferably the compound comprising groups that are reactive toward isocyanate groups is added to the isocyanato-functional compound, more preferably in two or more steps.

With particular preference the isocyanato-functional compound is introduced initially and the compounds comprising isocyanate-reactive groups are added. In particular the isocyanato-functional compound (a1) or (b1) is introduced first of all, followed by (a2) or (b2) and then (a5) or (b5) is added, or, preferably, the isocyanato-functional compound (a1) or (b1) is introduced first of all, and then (a5) or (b5) and subsequently (a2) or (b2) is added. After that it is possible to add further desired components as the case may be.

It will be appreciated that (a2) or (b2) and (a5) or (b5) can also be added in a mixture with one another.

For the preparation of the polyurethane dispersion the polyurethane prepared is mixed with water. Preferably, in a first step, the organic phase is prepared homogeneously and, in a second step, this organic phase is introduced into a water phase or a water phase is introduced into the organic phase thus prepared.

Within the dispersion prepared in this way the average particle size (z-average), measured by means of dynamic light scattering using the Malvern® Autosizer 2 C, is generally <1000 nm, preferably <500 nm, and more preferably <100 nm. Normally the diameter is 20 to 80 nm.

Producing the emulsion generally necessitates an energy input of not more than $10^8$ W/m$^3$.

The dispersions of the invention are particularly suitable for coating substrates such as wood, paper, textile, leather, nonwoven, plastics surfaces, glass, ceramic, mineral construction materials, such as cement moldings and fiber-cement slabs, and, in particular, for coating metals or coated metals.

After curing by means of high-energy radiation, the dispersions of the invention advantageously form films having good performance properties, such as good scratch resistance, chemical resistance, and weathering stability and/or good mechanical properties.

The substrates are coated in accordance with customary methods that are known to the skilled worker, involving the application of at least one dispersion of the invention to the substrate that is to be coated, in the desired thickness, and removal of the volatile constituents of the dispersions. This process can be repeated one or more times if desired. Application to the substrate may take place in a known way, e.g., by spraying, troweling, knifecoating, brushing, rolling, rollercoating or pouring. The coating thickness is generally situated within a range from about 3 to 1000 g/m$^2$ and preferably 10 to 200 g/m$^2$.

To remove the water comprised in the dispersion it is dried following application to the substrate, drying taking place for example in a tunnel oven or by flashing off. Drying can also take place by means of NIR radiation, NIR radiation here meaning electromagnetic radiation in the wavelength range from 760 nm to 2.5 µm, preferably from 900 to 1500 nm.

If desired, if two or more films of the coating material are applied one on top of another, a radiation cure may take place after each coating operation.

Radiation curing is accomplished by exposure to high-energy radiation, i.e., UV radiation or daylight, preferably light with a wavelength of 250 to 600 nm, or by irradiation with high-energy electrons (electron beams; 150 to 300 keV). Examples of radiation sources used include high-pressure mercury vapor lamps, lasers, pulsed lamps (flash light), halogen lamps or excimer emitters. The radiation dose normally sufficient for crosslinking in the case of UV curing is situated within the range from 80 to 3000 mJ/cm$^2$.

Irradiation may also if appropriate be carried out in the absence of oxygen, e.g., under an inert gas atmosphere. Suitable inert gases include, preferably, nitrogen, noble gases, carbon dioxide or combustion gases. Irradiation may also take place with the coating material being covered by transparent media. Transparent media are, for example, polymeric films, glass or liquids, e.g., water. Particular preference is given to irradiation in the manner as is described in DE-A1 199 57 900.

In one preferred process, curing takes place continuously, by passing the substrate treated with the preparation of the invention at constant speed past a radiation source. For this it is necessary for the cure rate of the preparation of the invention to be sufficiently high.

This varied course of curing over time can be exploited in particular when the coating of the article is followed by a further processing step in which the film surface comes into direct contact with another article or is worked on mechanically.

The advantage of the dispersions of the invention is that the coated articles can be processed further immediately following the radiation cure, since the surface is no longer sticky. On the other hand, the dried film is still sufficiently flexible and stretchable that the article can still be deformed without the film flaking or tearing.

The invention further provides for the use of a dispersion, as described above, for coating substrates of metal, wood, paper, ceramic, glass, plastic, textile, leather, nonwoven, or mineral construction materials.

The polyurethane dispersions of the invention can be used in particular as primers, surfacers, pigmented topcoat materials, and clearcoat materials in the sectors of industrial coating, especially aircraft coating or large-vehicle coating, wood coating, automotive finishing, especially OEM finishing or automotive refinish, or decorative coating. The coating materials are especially suitable for applications where particularly high application reliability, exterior weathering stability, optical qualities, solvent resistance and/or chemical resistance, and also scratch resistance are required.

The invention is illustrated by means of the following, nonlimiting examples.

EXAMPLES

Unless indicated otherwise, parts and percentages indicated are by weight.

Example 1

Preparation of a Dispersion 300 parts of a polyisocyanate containing biuret groups and based on hexamethylene diisocyanate (Basonat® HB 100 from BASF SE, Ludwigshafen), polyisocyanate (biuret) based on hexamethylene diisocyanate with an NCO content to DIN EN ISO 11909 of 22-23%), 332 parts of pentaerythrityl triacrylate, 73 parts of hydroxyethyl acrylate, 75 parts of acetone, 0.4 part of Kerobit®TBK, and 0.2 part of dibutyltin dilaurate are stirred at 65° C. in a three-neck flask for 3 hours, after which 15 parts of glycolic acid are added and the mixture is stirred at 65° C. for 3 hours more. Subsequently a further 135 parts of pentaerythrityl triacrylate are added and stirring continues at 65° C. for 3 hours. After that the mixture is neutralized with 20 parts of triethylamine and admixed dropwise with 1300 parts of water over the course of 90 minutes at 60-70° C.

The acetone is then removed by distillation. The particle size of the dispersion, measured after 2 weeks with a Malvern particle size measuring instrument, is 167 nm.

Example 2

Preparation of a Dispersion 368 parts of a polyisocyanate containing biuret groups and based on hexamethylene diisocyanate (Basonat® HB 100), 98 parts of hydroxyethyl acrylate, 32 parts of a polyesterdiol composed of adipic acid units and 1,4-butanediol units, OH number between 108 and 116 mg KOH/g, molecular weight about 1000 g/mol, 120 parts of acetone, 0.5 part of Kerobit®TBK, and 0.2 part of dibutyltin dilaurate are stirred at 75° C. in a three-neck flask for 1 hour, then admixed with 551 parts of pentaerythrityl triacrylate and 16 parts of glycolic acid, and stirred at 75° C. for a further 4 hours. The mixture is then neutralized with 21 parts of triethylamine and admixed dropwise over the course of 90 minutes at 60-70° C. with 1800 parts of water.

The acetone is then distilled off. The particle size of the dispersion, measured with a Malvern particle size measuring instrument, is 125 nm.

Example 3

Preparation of the Dispersion 233 parts of an isocyanurate (Vestanat® T 1890 from Evonik) based on isophorone diisocyanate, with an NCO content to DIN EN ISO 11909 of 11.7-12.3%, are mixed with 49 parts of hydroxyethyl acrylate, 0.3 part of Kerobit® TBK, 120 parts of acetone, and 0.4 part of dibutyltin dilaurate at room temperature and the mixture is then stirred for 1.5 hours at 65° C., after which 280 parts of pentaerythrityl triacrylate and 8 parts of glycolic acid are added and stirring is continued for a further 8 hours at 80° C. or until the NCO value has dropped to <0.15%. The mixture is subsequently neutralized with 11 parts of triethylamine and admixed dropwise over the course of 90 minutes at 60-70° C. with 1000 parts of water.

The acetone is then distilled off. The particle size of the dispersion is 275 nm.

Example 4

Preparation of a Dispersion 20 parts of the isocyanurate of isophorone diisocyanate (Vestanat® 1890), 45 parts of the isocyanurate of hexamethylene diisocyanate (Basonat® HI 100 from BASF SE, isocyanurate based on hexamethylene diisocyanate with an NCO content to DIN EN ISO 11909 of 21.5-22.5%), 68 parts of pentaerythrityl triacrylate, 50 parts of acetone, 0.2 part of Kerobit®TBK, and 0.02 part of dibutyltin dilaurate are stirred at 65° C. in a three-neck flask for 3 hours, after which 2 parts of glycolic acid are added and the mixture is stirred at 65° C. for 3 hours more. Subsequently 7 parts of methanol are added and stirring continues at 65° C. for 3 hours. After that the mixture is neutralized with 2 parts of triethylamine and admixed dropwise with 250 parts of water over the course of 30 minutes at 60-70° C. The acetone is then removed by distillation. The particle size of the dispersion, measured with a Malvern particle size measuring instrument, is 132 nm.

Performance Properties of the Dispersions

Example 5

140 parts of the dispersion from Example 1 are admixed with 2.3 parts of the photoinitiator Irgacure® 500 (Ciba).

The dispersion thus prepared is then applied to a variety of substrates, using a doctor blade, and the UV-cured film is investigated for its performance properties.

Example 6

140 parts of the dispersion from Example 2 are admixed with 2.3 parts of the photoinitiator Irgacure® 500 (Ciba).

The dispersion thus prepared is then applied to a variety of substrates, using a doctor blade, and the UV-cured film (exposed with 1400 mJ/cm$^2$) is investigated for its performance properties.

Example 7

140 parts of the dispersion from Example 4 are admixed with 2.3 parts of the photoinitiator Irgacure® 500 (Ciba).

The dispersion thus prepared is then applied to a variety of substrates, using a doctor blade, and the UV-cured film (exposed with 1400 mJ/cm$^2$) is investigated for its performance properties.

Comparative Example 1

A commercially available aliphatic, UV-curable dispersion (Laromer® 8949 from BASF SE, Ludwigshafen, Germany) (functionality 1.7, dispersion of an aliphatic urethane acrylate based on a polyesterdiol) is admixed as in Example 1 with lrgacure 500 and applied and exposed in the same way.

Preparation of the Coating Materials, and Performance Tests

The coating materials were applied in a film thickness of approximately 40 μm by means of a slotted doctor blade to glass, Bonder metal panel or white cardboard substrate, and exposed twice in a UV exposure unit, equipped with a high-pressure mercury UV lamp having an energy of 120 W/m, the distance between the lamp and the substrate being 10 cm, and the speed of the conveyor belt on which the coated substrates lie and are passed beneath the lamp being 10 meters (m)/minute (min).

Pendulum Damping

The pendulum damping (DIN 53 157) is a measure of the hardness of the coating. It is reported in swings, with high values denoting high hardness.

Erichsen Cupping

The Erichsen cupping (DIN 53 156) is a measure of the flexibility and elasticity of the coating. To determine the Erichsen cupping, the coating material is applied to BONDER metal panel 132, and exposed as described above. Subsequently the Erichsen cupping is determined by pressing a metal ball into the uncoated side of the metal panel, and determining the depth of impression at which the film ruptures. The result is reported in millimeters (mm), with high values denoting high flexibility.

Scratch Resistance

The exposed films were scratched with a ScotchBrite Fleece under a load of 750 g, with 10 back-and-forth strokes, and the difference in gloss at a measurement angle of 60°, before and after scratching, was ascertained. The gloss retention is the percentage value formed from gloss after scratching to gloss before scratching.

Chemical Resistance

Drops of different liquids were applied to the exposed coatings. After an exposure time of 24 hours, it is ascertained whether there are instances of permanent damage or coloration, the results being scored from 0 (=no damage or color) to 5 (severe damage or color).

Pendulum hardness
Fingernail hardness
Chemical stability (soda, red wine, coffee, mustard, lipstick, ballpoint paste)

|  | Example 5 | Comp. Ex. 1 | Example 6 | Example 7 |
|---|---|---|---|---|
| Pendulum hardness (swings) | 102 | 110 | 135 | 114 |
| Gloss retention (%) | 90 | 7 | 96 | 98 |
| CH soda | 0 | 0 | 0 | 0 |
| CH red wine | 0 | 0 | 0 | 0 |
| CH coffee | 0 | 0 | 0 | 0 |
| CH mustard | 0 | 3 | 0 | 0.5 |
| CH lipstick | 0 | 0 | 0 | 0 |
| CH ballpoint paste | 0 | 4 | 1 | 0 |

The invention claimed is:

1. A mixture comprising a radiation-curable water-dispersible polyurethane (A), synthesized from
   (a1) at least one polyisocyanate having at least one moiety selected from the group consisting of an isocyanuate, a biuret, and an allophanate based on 1,6-hexamethylene diisocyanate and/or isophorone diisocyanate,
   (a2) at least one compound having one isocyanate-reactive group, and having at least one free-radically polymerizable C=C double bond selected from the group consisting of 2-hydroxyethyl acrylate, 2-hydroxyethyl methacrylate, 2-hydroxypropyl acrylate, 2-hydroxypropyl methacrylate, pentaerythrityl triacrylate, and dipentaerythrityl pentaacrylate,
   (a3) optionally at least one compound having at least two isocyanate-reactive groups selected from a hydroxyl, a mercapto, a primary amino, and a secondary amino group, and having a number-average molar weight Mn of not more than 500 g/mol,
   (a4) optionally at least one compound having at least two isocyanate-reactive groups selected from a hydroxyl, a mercapto, a primary amino, and a secondary amino group, and having a number-average molar weight Mn of more than 500 g/mol,
   (a5) at least one compound having at least one isocyanate-reactive group and at least one dispersive group,
   (a6) optionally at least one compound other than (a2) and (a5) that has a single isocyanate-reactive group, and
   (a7) optionally at least one polyisocyanate other than (a1),
   wherein an amount of isocyanate-reactive groups in (a4) is 0 to 10 mol %, based on a sum of the isocyanate groups in (a1) and (a7), and
   wherein the polyurethane (A) has at least 3 mol/kg of free-radically polymerizable C=C double bonds,
   the mixture further comprising a radiation-curable water-dispersible polyurethane (B), different from (A) and synthesized from
   (b1) at least one di- or polyisocyanate selected from the group consisting of an isocyanuate, a biuret, and an allophanate,
   (b2) at least one compound having one isocyanate-reactive, and having at least one free-radically polymerizable C=C double bond selected from the group consisting of 2-hydroxyethyl acrylate, 2-hydroxyethyl methacrylate, 2-hydroxypropyl acrylate, 2-hydroxypropyl methacrylate, pentaerythrityl triacrylate, and dipentaerythrityl pentaacrylate,
   (b3) optionally at least one compound having at least two isocyanate-reactive groups selected from a hydroxyl, a mercapto, a primary amino, and a secondary amino group, and having a number-average molar weight Mn of not more than 500 g/mol,
   (b4) obligatorily at least one compound having at least two isocyanate-reactive groups selected from a hydroxyl, a mercapto, a primary amino, and a secondary amino group, and having a number-average molar weight Mn of more than 500 g/mol,
   (b5) at least one compound having at least one isocyanate-reactive group and at least one dispersive group,
   (b6) optionally at least one compound other than (b2) and (b5) that a single isocyanate-reactive group, and
   (b7) optionally at least one polyisocyanate other than (b1),
   wherein the at least one compound (b4) comprises a polyesterdiol having an amount of isocyanate-reactive groups of more than 10 mol %, based on a sum of the isocyanate groups in (b1) and (b7),
   wherein a mass ratio (A):(B) is 5:95 to 95:5,
   wherein the polyurethane (A) has a glass transition temperature of more than 20° C. and the polyurethane (B) has a glass transition temperature of not more than 10° C.

2. The mixture according to claim 1, wherein (b4) is a polyesterdiol synthesized exclusively from aliphatic or cycloaliphatic building blocks.

3. The mixture according to claim 1, wherein (a5) and (b5) each independently are selected from the group consisting of dimethylolpropionic acid, glycolic acid, and thioglycolic acid.

4. The mixture according to claim 1, wherein the polyurethane (A) comprises, per 100 mol % of reactive isocyanate groups in (a1) and (a7) (in total):
   30 to 95 mol % of (a2),
   0 to 30 mol % of (a3),
   0 to 10 mol % of (a4),
   5 to 30 mol % of (a5),
   0 to 10 mol % of (a6),
   wherein a sum of all isocyanate-reactive groups is 80 to 125 mol % of the reactive isocyanate groups in (a1) and (a7) (in total).

5. The mixture according to claim 1, wherein the polyurethane (B) comprises, per 100 mol % of reactive isocyanate groups in (b1) and (b7) (in total):
   30 to 90 mol % of (b2),
   0 to 30 mol % of (b3),
   10 to 40 mol % of (b4),
   5 to 30 mol % of (b5),
   0 to 10 mol % of (b6),
   wherein a sum of all isocyanate-reactive groups is 80 to 125 mol % of the reactive isocyanate groups in (b1) and (b7) (in total).

6. A process of coating a substrate with the mixture of claim 1, the process comprising contacting the mixture with a substrate comprising a metal, a wood, a paper, a ceramic, a glass, a plastic, a textile, a leather, a nonwoven, or a mineral construction material.

7. The mixture of claim 1, wherein the mass ratio (A):(B) is 40:60 to 60:40.

8. The mixture of claim 1, wherein the polyurethane (A) comprises, per 100 mol % of reactive isocyanate groups in (a1) and (a7) (in total):
70 to 80 mol % of (a2),
0 to 10 mol % of (a3),
0 to 3 mol % of (a4),
18 to 20 mol % of (a5),
0 to 2 mol % of (a6),
wherein a sum of all isocyanate-reactive groups is 80 to 125 mol % of the reactive isocyanate groups in (a1) and (a7) (in total).

9. The mixture of claim 1, wherein the polyurethane (B) comprises, per 100 mol % of reactive isocyanate groups in (b1) and (b7) (in total):
70 to 80 mol % of (b2),
0 to 10 mol % of (b3),
20 to 25 mol % of (b4),
18 to 20 mol % of (b5),
0 to 2 mol % of (b6),
wherein a sum of all isocyanate-reactive groups is 80 to 125 mol % of the reactive isocyanate groups in (b1) and (b7) (in total).

10. The mixture of claim 1, wherein (a1) is a polyisocyanate that comprises an isocyanurate group, and that is based on isophorone diisocyanate.

11. The mixture of claim 1, wherein (b1) is a polyisocyanate that comprises an isocyanurate group, and that is based on 1,6-hexamethylene diisocyanate.

12. The mixture of claim 1, wherein (a2) is pentaerythritol pentaacrylate.

13. The mixture of claim 1, wherein (b2) is 2-hydroxyethyl acrylate.

14. The mixture of claim 1, wherein the polyurethane (B) has a higher number-average molecular weight than the polyurethane (A).

15. The mixture of claim 14, wherein the polyurethane (A) has a number-average molecular weight not larger than 2000 g/mol, and the polyurethane (B) has a number-average molecular weight not larger than 5000 g/mol.

* * * * *